Patented Nov. 18, 1952

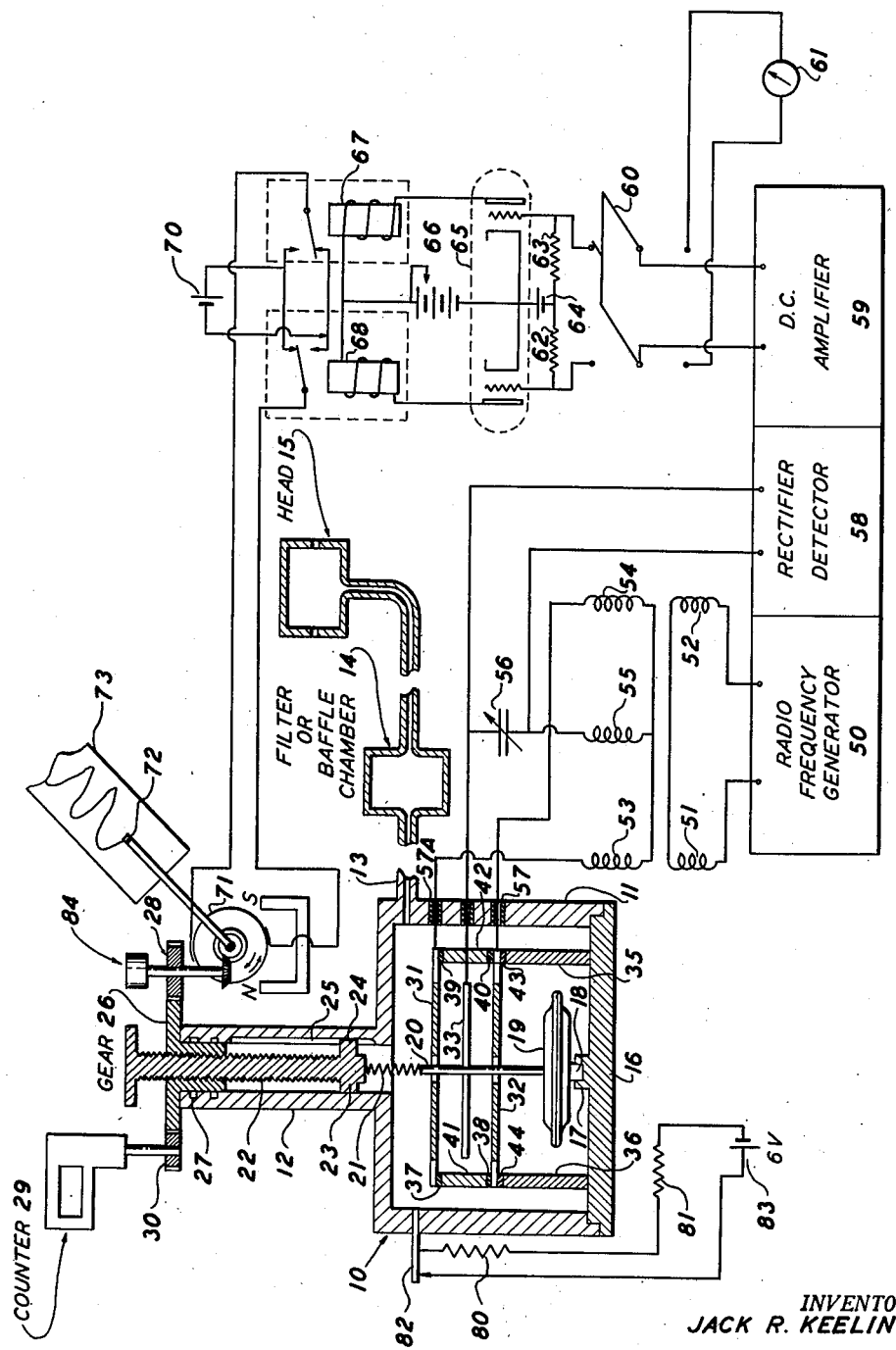

2,618,157

UNITED STATES PATENT OFFICE 2,618,157

FLUID PRESSURE MEASUREMENT

Jack R. Keeling, Jr., Monahans, Tex., assignor to United Geophysical Company, Inc., Pasadena, Calif., a corporation of California Application October 10, 1947, Serial No. 779,007

5 Claims. (Cl. 73—386)

This invention is concerned with pressure measuring devices of the type which includes a distortable body that changes dimensions in response to changes in pressure exerted thereon. More particularly, the invention provides improvements in barometers, altimeters, etc., of the aneroid type, to the end that increase in the accuracy and convenience of readings may be obtained.

It has been proposed heretofore to measure pressure changes by permitting the pressure to operate upon a distortable body, say a bellows, which changes shape or dimension in response to changes in pressure, electrical sensing means being employed to indicate such changes.

As a result of my investigations, I have developed improvements in pressure measuring devices of this type which automatically null the indicator, and permit a continuous indication of pressure changes to be made more conveniently than heretofore.

In this preferred form, the instrument of the invention is a barometric altimeter which is extremely accurate and sensitive and which may be used as a surveying altimeter in land surveys and the like.

In one aspect, my invention contemplates a pressure measuring device including a distortable body which changes dimension in response to changes in pressure exerted thereon, an electrical circuit, and electrical sensing means mechanically connected to the body and electrically connected to the circuit for sensing a change in dimensions, preferably as an electrical unbalance in the circuit. Such apparatus, in accordance with my invention also includes mechanical means connected with the said body for counteracting the pressure which tends to distort it, and a servo mechanism connected to the circuit and to the mechanical means for actuating the latter in response to an unbalance in the circuit. Preferably the apparatus outlined above is equipped with an indicator connected to the servo mechanism to show the direction and amount of movement of the servo mechanism and thus indirectly indicate the amount and direction of the pressure change which the servo mechanism compensates. The indicator may be a recorder, for example, a recorder which records changes in pressure as a function of time.

Since my surveying altimeter is likely to be installed in a vehicle and since small but significant pressure errors within the vehicle may result from the restricted air flow through the vehicle when wind is present, an external non-directional air pickup and a conduit preferably are employed to transmit the external atmospheric pressure to the altimeter intake and then to the pressure sensitive element which has been isolated from other pressure sources. The steady atmospheric pressure is desired, but when the wind is gusty, a rapidly fluctuating small pressure variation interferes with the measurement. I have discovered that by including a chamber containing baffles or material offering air flow resistance in the air path from the air pickup to the altimeter that there is an appreciable reduction in the disturbing fluctuation of pressure.

In one form of my device the pressure-distortable member is a bellows which varies in thickness in response to changes in pressure of a fluid in contact with the bellows. To increase accuracy of measurement with a device of this character, I provide a base to which one side of the bellows is mounted, a rigid mounting fastened to the base and extending in the direction in which the thickness of the bellows is measured, and electrical means for detecting changes in the thickness of the bellows and including a first element fastened rigidly to the bellows and a second element fastened rigidly to the mounting and in capacitive relationship with the first element, the mounting being such that its thermal expansion in the direction of the thickness of the bellows is substantially equal to the thermal expansion of the bellows in the same direction.

These and other features of the invention will be understood more thoroughly in the light of the following detailed description taken in conjunction with the accompanying single figure which is a schematic diagram illustrating one form of recording altimeter constructed in accordance with the invention.

Referring to the drawing, the apparatus comprises an aneroid altimeter 10 shown in vertical section and having a cylindrical case 11. The base has a coaxial tubular extension 12 at its top and is hermetically sealed save for a conduit 15 which enters the side of the case. This conduit extends into a baffle chamber or filter 14 which may be filled with a permeable material such as steel wool to damp minor pressure fluctuations. Beyond the filter or baffle chamber the conduit continues to terminate in a pressure intake head 15 which is simply a chamber provided with perforations or openings through which the fluid (say air), the pressure of which is to be measured, may enter.

The bottom of the case or chamber is formed by a circular base plate 16 which fits tightly against the case. There is a coaxial projection 17 on the upper surface of the base plate and in this is held rigidly a projection 18 of a conventional aneroid bellows 19.

The bellows conveniently is formed of opposed dished plates of thin metal, say beryllium copper. The edges of the two plates are welded together, and the interior of the sealed bellows is filled with water vapor at reduced pressure. A coaxial stem 20 is fastened rigidly to the upper surface of the bellows and extends vertically above it. The upper end of the stem is fastened to a helical tension spring 21 which in turn is fastened rigidly to the bottom of a screw member 22. This screw member 22 extends upwardly in the tubular extension of the case. Its lower end carries a slider 23 which is fastened rigidly to it and slides up and down in the tubular extension, being prevented from turning therein by means of a key 24 which slides in a vertical key-way 25.

The upper end of the screw member is threaded coaxially through a sealing gear 26, which is journaled in the top of the tubular extension and seals it. Oil rings 27 may be cut in the inner wall of the tubular extension at the point where the gear is journaled. Oil in the rings aids in the sealing and prevents leakage through the journal.

The gear 26 operates a counter 29 of conventional type through a second gear 30 which meshes with the gear 26.

Of the various types of electrical sensing means for determining changes in the dimensions of the aneroid bellows, the one presented in the drawing is preferred. Thus the sensing means comprises a pair of condensers 31, 32 having a common movable condenser plate 33. The common condenser plate is mounted in a horizontal plane on the stem of the bellows. The other two condenser plates 31, 32 are mounted horizontally respectively above and below the movable condenser plate and are held apart by insulating spacers. The two plates in turn are held rigidly to the base by vertical posts 35, 36 which are fastened rigidly to the base plate 16.

To increase the accuracy of measurement of pressure change, the posts 35, 36 should be of such dimension and material that their expansion in a vertical direction under thermal influence is the same as the expansion of the bellows under the same influence. In the instant case, the supporting posts are made of brass and their length is such as to compensate almost completely the thermal changes in thickness of the bellows.

The upper and lower fixed condenser plates are spaced from each other by insulators 37, 38, 39, 40 which in turn are spaced from each other by Invar rods 41, 42. These rods are employed because of their low coefficient of thermal expansion, so that temperature changes bring little if any variation in the spacing between the fixed condenser plates.

Insulating bushings 43, 44 are disposed immediately below the lower condenser plate 32 to insulate it from the brass supporting posts.

The condensers 31, 32 are within the hermetically sealed chamber of the altimeter and may be part of an electrical measuring instrument disclosed and claimed in United States Patent No. 2,371,395 granted March 13, 1945, to Jack R. Keeling, Jr.

This instrument contains a stable alternating current source 50 which may use a crystal oscillator for stability. This source supplies alternating current to series exciting coils 51, 52. A pair of coils 53, 54 which are as identical in electrical characteristics as possible are coupled equally to their respective exciting coils 51, 52 in an additive manner. This excitation, enhanced by resonance, produces a high electric field (for a given power input) between the condenser plates 31, 32. Insulation bushings 57, 57A prevent the case from shorting to the electrical connections. The plate 33 is the moving element of a capacitative potentiometer formed by the three plates 31, 32, 33. Plate 33 in operation is near the central position as shown in the drawing. The amount of the excitation for the third series resonance circuit composed of the coil 55 and the condenser 56 is dependent upon the displacement of the plate 33 from the electrical center between the plates 31, 32. Ideally the electrical center is the mechanical center but stray electrical elements of the circuit may shift the two positions an inconsequential amount.

The condenser 56 is shown as being variable or better still adjustable, since in practice a variable component is needed to adjust for resonance. The voltage from the condenser or capacitor 56 is fed into a rectifier type detector 58 and the detector output is then further amplified by a D. C. amplifier 59. The detector 58 produces an output signal having a polarity which is determined by the phase relationship between the radio frequency signal produced across the condenser 56 and the signal produced by the generator 50. The output of the D. C. amplifier may be switched to a servo mechanism circuit for automatic adjustment. With the switch 60 thrown for automatic operation, the output of the D. C. amplifier is impressed on the grids of a twin triode vacuum tube 65. Resistors 62, 63 are employed for proper grid impedance and as a path for proper grid bias from a battery 64. The plate load for each triode is a single armature double throw sensitive relay 67, 68. These relays are alike. The power supply for the tube 65 is shown as a battery 66 which can be used partly or entirely. The voltage adjustment of this battery may be used as a means of adjusting the tube 65 for optimum operation. The normal unexcited armature position for both relays is of that of the armature of relay 68 in the drawing. Another battery 70 is connected to the contacts of relays 67, 68 in a manner whereby relay operation can control the direction of rotation of a permanent magnet field D. C. servomotor 71. This servomotor is geared to the control gear 26 and to a recording pen 72 which is a part of a recorder 73.

The output from the D. C. amplifier, being approximately proportional and in appropriate polarity to the error of the null adjustment of the gear 26, operates the relay 67 by increasing the plate current flowing through it while the plate current through the relay 68 is further reduced below the threshold of operation. The servomotor being energized by the operation of the relay 67 reduces the null error and hence the output from the D. C. amplifier. This reduction in error continues until the error is small and acceptable, and the current in the relay 67 will meanwhile have been reduced to a value too low for operation, thereby releasing the armature which in turn stops the servomotor.

Were the null error reverse in direction, the relay 68 would operate instead of the relay 67 and again the servomotor would reduce the error as before.

To simplify the explanation the number of components have been limited to those of essential functions. Those components which contribute to longer satisfactory operation of the essential components have been omitted since their functions are well known to the art.

Mechanical linkages are provided from the servomotor to the recorder 73 which may employ the pen 72 for transcribing the pressure changes denoted by the position of the gear 26 or the counter 29. The second coordinate of the recorder is preferably time. Hence, the described mechanism is an automatic pressure recorder which may be calibrated in the desired units appropriate for altimeter surveys.

To be certain that the most sensitive portions of the pressure measuring mechanism are not sensibly affected by the variation in temperature experienced in operation, a distributed heater is indicated by the resistances 80, 81, which maintain the case 10 and bottom 16 at a higher than the maximum normal temperature encountered in operation. This heater circuit is controlled by a thermal regulator 82 in close thermal proximity to the case 10, and the source of energy therefor is a battery 83. The use of the thermal control circuit is optional. However, its second function is that of preventing condensation of moisture. In extremely humid areas, the need for a convenient means of preventing accumulation of water in a precision instrument is readily understandable.

In practice the servo mechanism can be disengaged and removed along with the recorder. With the switch 60 thrown to the indicator 61, manual operation using a knob 84 attached to the gear 28 is then the means of operation.

I claim:
1. In a device for measuring the pressure of a fluid, the combination which comprises a chamber, a sealed bellows member rigidly mounted on the inside of the chamber and to the base thereof, a stem connected to the bellows on the side opposite the base and extending perpendicularly with respect to the base, an electrical circuit for detecting changes in the thickness of the bellows and comprising two plates mounted in a fixed position within the chamber and spaced from each other, the arrangement being such that the stem extends through the plates and is free to move in the direction of its longitudinal axis, a third plate fastened rigidly to the stem between the said two plates, the third plate being in capacitive relationship with the said two plates, mechanical means connected through a wall in said chamber to said stem for exerting a force on the stem to counteract distortion of the bellows, a pair of inductances connected in series between said two fixed plates, a generator for producing a radio frequency signal coupled to the pair of inductances, a series resonant circuit having a capacitive element and an inductive element connected between said third plate and the junction between said pair of inductances, a detector coupled to one of the elements of said series resonant circuit for producing an output signal having a polarity which is determined by the phase relationship between the radio frequency signal produced across said one element of the series resonant circuit and the signal produced by said generator, a servo system connected between the output circuit of the detector and said mechanical means for actuating the mechanical means in response to the signal produced at the output circuit of the detector, an indicator connected to said mechanical means for indicating the magnitude and direction of its movement and a single inlet means for admitting said fluid into the chamber.

2. Apparatus according to claim 1 wherein said two plates are mounted on supports extending from the base of the chamber in the direction of the thickness of the bellows, the coefficient of thermal expansion of the supports being such that their thermal expansion is substantially equal to the thermal expansion of the bellows in the same direction.

3. A device for measuring the pressure of a fluid, comprising a chamber, means for admitting the fluid to the chamber, a sealed bellows member rigidly mounted inside the chamber, a pair of conductive plates mounted in a fixed position with respect to the bellows member and having spaced, mutually opposed surfaces, a third conductive plate located between said pair of plates, mechanical means connecting the third plate to the bellows for causing the location of the third plate to vary in accordance with distortion of the bellows, a pair of inductances connected in series between said pair of conductive plates, a generator for producing a radio frequency signal coupled to the pair of inductances so that the magnitudes of the signals induced in the inductances are substantially equal, a series resonant circuit having a capacitive element and an inductive element connected between the third conductive plate and the junction between the pair of inductances, a detector coupled to one of the elements of said series resonant circuit for producing a direct current output signal having a polarity which is determined by the phase relationship between the radio frequency signal produced across said one element of the series resonant circuit and the signal produced by said generator, a servo system connected between the output circuit of the detector and said mechanical means for actuating the mechanical means in response to the signal produced at the output circuit of the detector and thereby counteracting distortion of the bellows, and an indicator coupled to said mechanical means for indicating the magnitude and direction of its movement.

4. The apparatus of claim 3 wherein the generator for producing a radio frequency signal is crystal controlled.

5. In a pressure measuring device including a distortable body which changes dimensions in response to changes in pressure exerted thereon, mechanical means connected to said distortable body for exerting a force to counteract the force which distorts the body, a direct current motor coupled to the mechanical means for actuating it, and an indicator coupled to the mechanical means for indicating the magnitude and direction of its movement, the combination which comprises means coupled to the distortable body for providing a direct current signal at its output circuit having a magnitude which varies in accordance with the changes in dimensions of the distortable body from a reference dimension and having a polarity which is determined by the direction of the change in dimensions of the distortable body with respect to the reference dimension, a pair of resistances connected in series across said output circuit, a pair of unidirectional conductors each having a cathode, an anode and a control electrode, means respectively connecting said control electrodes to the junctions between the pair of resistances and said output circuit, means connecting said cathode electrodes to the junction between said pair of resistances, a source of potential having its negative terminal connected to said cathodes, a pair of relays, the windings of the relays being respectively connected between the positive terminal of said source of potential and said anode electrodes, a second source of potential, and means connecting the armatures and contacts of said relays between the second source of potential and said direct current motor for connecting the source of potential in one polarity across the motor when one of the relays is operated and connecting the source of potential in the other polarity across the motor when the other relay is operated.

JACK R. KEELING, Jr.

REFERENCES CITED

The following references are of record in the file of this patent:

UNITED STATES PATENTS

| Number | Name | Date |
|---|---|---|
| 1,586,201 | Kauffmann | May 25, 1926 |
| 1,953,819 | Payne | Apr. 3, 1934 |
| 2,046,539 | Willach | July 7, 1936 |
| 2,079,921 | Osnos | May 11, 1937 |
| 2,185,578 | Bearsley et al. | Jan. 2, 1940 |
| 2,367,866 | Humphreys et al. | Jan. 23, 1945 |
| 2,368,278 | Warshaw | Jan. 30, 1945 |
| 2,370,040 | Fisher et al. | Mar. 6, 1945 |
| 2,398,470 | Shivers | Apr. 16, 1946 |
| 2,445,335 | Philbrick et al. | July 20, 1948 |
| 2,447,817 | Rieber | Aug. 24, 1948 |
| 2,484,541 | Allwein | Oct. 11, 1949 |